US011256763B2

(12) United States Patent
Doh (10) Patent No.: US 11,256,763 B2
(45) Date of Patent: Feb. 22, 2022

(54) SYSTEM AND METHOD FOR SEARCHING FOR OBJECT BASED ON PROPERTY THEREOF

(71) Applicant: Mycelebs Co., Ltd., Seoul (KR)

(72) Inventor: Jun Woong Doh, Seoul (KR)

(73) Assignee: MYCELEBS CO., LTD.

( * ) Notice: Subject to any disclaimer, the term of this patent is extended or adjusted under 35 U.S.C. 154(b) by 477 days.

(21) Appl. No.: 15/879,700

(22) Filed: Jan. 25, 2018

(65) Prior Publication Data
US 2018/0210956 A1    Jul. 26, 2018

(30) Foreign Application Priority Data

Jan. 26, 2017  (KR) .................. 10-2017-0012871

(51) Int. Cl.
*G06F 16/00* (2019.01)
*G06F 16/951* (2019.01)
*G06F 16/248* (2019.01)
*G06F 16/28* (2019.01)
*G06F 16/2457* (2019.01)
*G06F 16/58* (2019.01)

(52) U.S. Cl.
CPC .......... *G06F 16/951* (2019.01); *G06F 16/248* (2019.01); *G06F 16/24573* (2019.01); *G06F 16/285* (2019.01); *G06F 16/289* (2019.01); *G06F 16/58* (2019.01)

(58) Field of Classification Search
None
See application file for complete search history.

(56) References Cited

U.S. PATENT DOCUMENTS 6,631,364 B1 * 10/2003 Rioux ................ G06K 9/00201
7,725,501 B1 *  5/2010 Stillman ............... G06F 16/289
                                                               707/805

FOREIGN PATENT DOCUMENTS

JP     2016091522 A    5/2016
KR     100851422 B1    8/2008

OTHER PUBLICATIONS

Korean Office Action for Korean Application No. 1020170012871 dated Mar. 31, 2018.

* cited by examiner

*Primary Examiner* — Anhtai V Tran
(74) *Attorney, Agent, or Firm* — Fay Sharpe LLP (57) ABSTRACT

An object property-based search system according to an embodiment of the present invention includes a search requester terminal for enabling a search requester to input at least one property of a plurality of object properties and receiving a search result based on the object properties, and an object providing device including an object property database in which the plurality of object properties is stored, and an object search server for searching for an object corresponding to the object properties transmitted from the search requester terminal using the object property database and transmitting the objects searched for to the search requester terminal.

12 Claims, 5 Drawing Sheets

SYSTEM AND METHOD FOR SEARCHING FOR OBJECT BASED ON PROPERTY THEREOF

The present application claims priority to Korean Patent Application No. 10-2017-0012871, filed Jan. 26, 2017, the entire contents of which is incorporated herein for all purposes by this reference.

BACKGROUND OF THE INVENTION

Field of the Invention

The present invention relates generally to a technique capable of searching for an object such as an artwork, a photograph, a picture, and the like, and more particularly, to a system and a method capable of searching for a desired object based on a property thereof.

Description of the Related Art

In a current society, it is possible to view a variety of information by virtue of developments of Internet, and it is possible to directly search and view information desired by an individual through a search system.

When a user inputs search words corresponding to an object to be searched for, the search system may provide the user with objects related to the input search words, for example, books, moving pictures, photographs, artworks, and the like.

However, since such a search method is performed using only keywords input by the user, the user may not completely obtain the object to be searched for when the user does not remember the keywords.

In other words, the user needs to accurately know a title or a name of an object to be searched for, such as a book, a moving image, or an artwork, and keywords related to the object, in order to obtain the desired object.

SUMMARY OF THE INVENTION

The present invention has been made in view of the above problems, and it is an object of the present invention to obtain not only a desired object but also a wide range of objects related thereto, by selecting items based on object properties, for example, texture, brightness and saturation, emotive words, and color distribution of the object according to individual preference without a need for a user to specify a search keyword directly.

In order to solve the problems, an object property-based search system according to an embodiment of the present invention includes a search requester terminal for enabling a search requester to input at least one property of a plurality of object properties and receiving a search result based on the object properties, and an object providing device including an object property database in which the plurality of object properties is stored, and an object search server for searching for an object corresponding to the object properties transmitted from the search requester terminal using the object property database and transmitting the objects searched for to the search requester terminal. The object properties are defined as characteristics or attributes inherent to the object, and the object property database is configured to include information on the object properties.

The object searched for may be a plurality of objects, and the object search server comprehensively searches the object property database in which information on the object properties input by the search requester is stored, based on information on the object properties, and transmits the plurality of objects to the search requester terminal in a form of a list obtained by prioritizing the plurality of objects.

The object search server may transmit at least one list that makes it possible to view all objects associated with the object properties input by the search requester together with the object searched for, when transmitting information on the object searched for to the search requester terminal.

When the search requester selects the list through the search requester terminal, the object search server may search the object property database in which information on the object properties input by the search requester is stored, based on the information on the object properties and transmit the plurality of objects to the search requester terminal in a form of a list obtained by prioritizing the plurality of objects.

When the search requester further inputs one object of the plurality of objects transmitted to the search requester terminal, the object search server further searches the object property database and transmits information related to the corresponding object input by the search requester to the search requester terminal.

According to an embodiment of the present invention to address the problems, a method of searching for an object based on a property thereof is performed based on object properties by an object property-based search system including a search requester terminal, an object property database, and an object search server. The method includes:

inputting at least one object property of a plurality of object properties with a search requester terminal by the search requester; and searching for an object corresponding to the object property transmitted from the search requester terminal using the object property database and transmitting the object searched for to the search requester terminal by the object search server. Herein, the object properties are defined as characteristics and attributes inherent to the object.

The object searched for may be a plurality of objects, and the transmitting the object searched for to the search requester terminal by the object search server further includes, comprehensively searching the object property database in which information on object properties input by the search requester is stored, based on information on the object properties and transmitting the plurality of objects in a form of a list obtained by prioritizing the plurality of objects.

The transmitting the object searched for to the search requester terminal by the object search server further includes transmitting at least one list that makes it possible to view all objects associated with the object properties input by the search requester together with the object searched for.

When the search requester selects the list through the search requester terminal, the method of searching for the object based on the property thereof further includes causing the object search server to search the object property database in which information on the object properties input by the search requester is stored, based on the information on the object properties, and transmit the plurality of objects to the search requester terminal in a form of a list obtained by prioritizing the plurality of objects.

When the search requester further inputs one object of the plurality of objects transmitted to the search requester terminal, the method of searching for the object based on the property thereof further includes causing the object search server to searches the object property database and transmit information related to the corresponding object input by the search requester to the search requester terminal.

The information on the object properties may include information for classifying the object properties into numerical values and information related to the object associated with the classified values.

The information related to the object may include at least one of a title or name, an original title, an artist, a production date, the age, a type, a technique, dimensions, and a holding location of the object, associated with the object.

The features and advantages of the present invention will become more apparent from the following detailed description based on the accompanying drawings.

Prior to this, terms and words used in the present specification and claims should not be construed in a conventional and dictionary sense, but should be construed as having a meaning and concept consistent with the technical idea of the present invention based on a principle that the inventor can properly define the concept of the term in order to best explain his own invention.

The present invention has an advantage in that a user can easily select items based on object properties, for example, texture, brightness and saturation, emotive words, and color distribution of an object according to personal preference without specifying a search keyword directly, thereby obtaining a desired object and a wide range of objects related thereto.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The objectives, specific advantages, and novel features of the present invention will become more apparent from the following detailed description taken in conjunction with the accompanying drawings.

It should be noted that upon adding the reference numerals to the components of each drawing in the present specification, even if the reference numerals are displayed on different drawings, they have the same numerals when possible.

Also, the terms "first", "second", and the like are used to distinguish one component from another component, but the components are not constrained by the terms.

In the following description of the present invention, a detailed description of known arts that may unnecessarily obscure the subject matters of the present invention will be omitted.

Hereinafter, preferable embodiments of the present invention will be described in detail referring to accompanying drawings.

Figure 1:
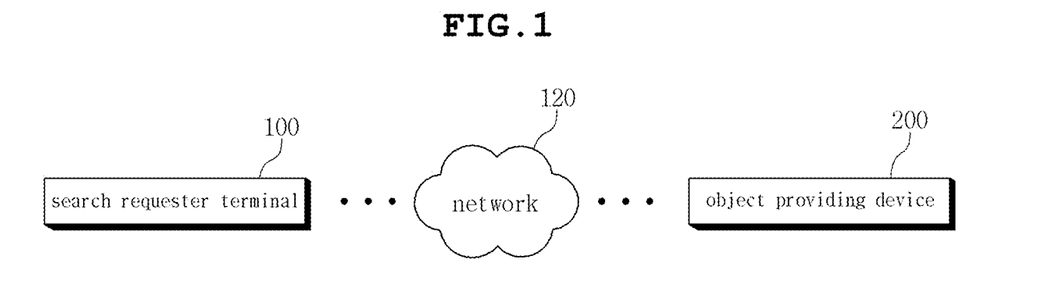
FIG. 1 illustrates an object property-based system according to the present invention.

FIG. 1 illustrates an object property-based system according to the present invention. The object property-based system includes a search requester terminal 100, an object providing device 200, and a network 120 that connects the search requester terminal and the object providing device via a wire or wirelessly.

The search requester terminal 100 is used when a search requester wants to search for a desired object, for example, a book, a moving image, a photograph, an artwork, and the like, which enables the search requester to input at least one property of a plurality of object properties and receive a searching result based on the object property, thereby displaying the result. Although the object property includes, but is not limited to, texture, brightness/saturation, and color distribution, and emotive words of the object for the purpose of convenience of the search requester herein, the present application is not limited thereto and includes all properties that may represent or describe characteristics or attributes inherent to a object, including, for example, even attributes that may explain degrees of spiciness and saltiness of food.

Figure 3:
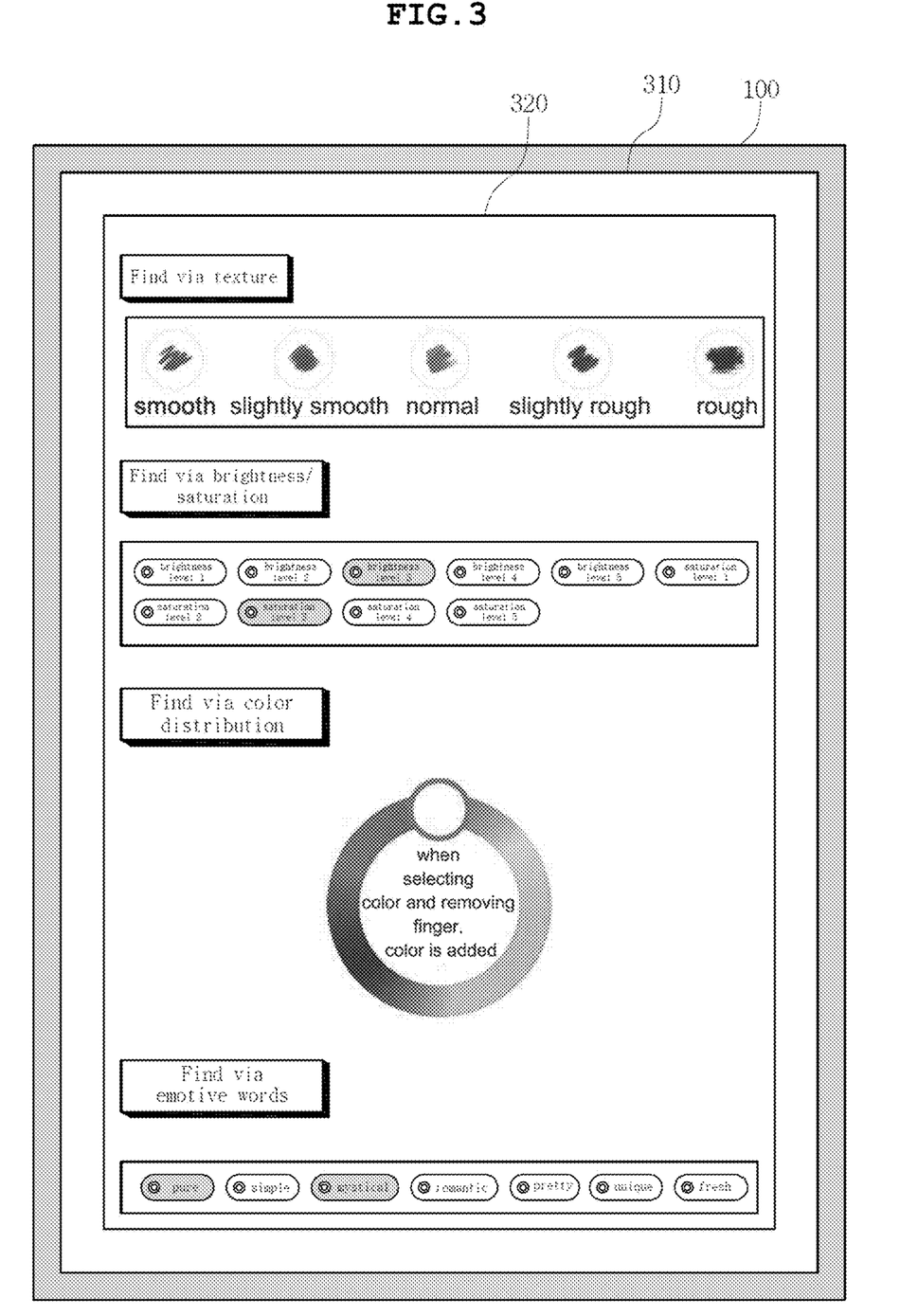
FIG. 3 illustrates a plurality of object properties displayed on a display of a search requester terminal according to the present invention.

Accordingly, the search requester terminal 100 may provide the search requester with, for example, texture properties, brightness/saturation properties, color distribution properties, and the like through a display of the terminal (e.g., 310 in FIG. 3), and the search requester may enter or select one of texture properties, brightness/saturation properties, color distribution properties, and emotive word properties provided, as shown in FIG. 3. Herein, the texture properties may be represented as a plurality of textures such as "smooth", "slightly smooth", "normal", "slightly rough", "rough", and the like, whereby the search requester may select one from the above-mentioned representations to easily find the object (for example, artwork, etc.) having information of the selected texture. As shown in FIG. 3, similarly to the texture properties, the brightness/saturation properties, the color distribution properties, and the emotive word properties are represented as various properties, for example, brightness level 1 to level 5, and saturation level 1 to level 5 in the brightness/saturation properties, so that they may be configured to cause the search requester to select one from these levels.

Meanwhile, FIG. 3 shows an example of a plurality of object property items constituting the object property-based list section displayed on the display of the search requester terminal, but the present invention is not limited thereto. For example, among the plurality of object property items, although 「Find via textures 」 may be configured as a bar shape, it may be configured as a circular shape like 「Find via color distribution」, and it may be also configured as keyword input method.

The search requester terminal 100 may include, but not limited thereto, a type of computer, a type of smart phone, a device for digital broadcasting, and the like, equipped with a processor capable of performing the above functions, a power source capable of driving the processor, a transceiver unit capable of transmitting and receiving data with a counterpart device or apparatus via the network 120, a memory capable of storing various data, and like.

Figure 2:
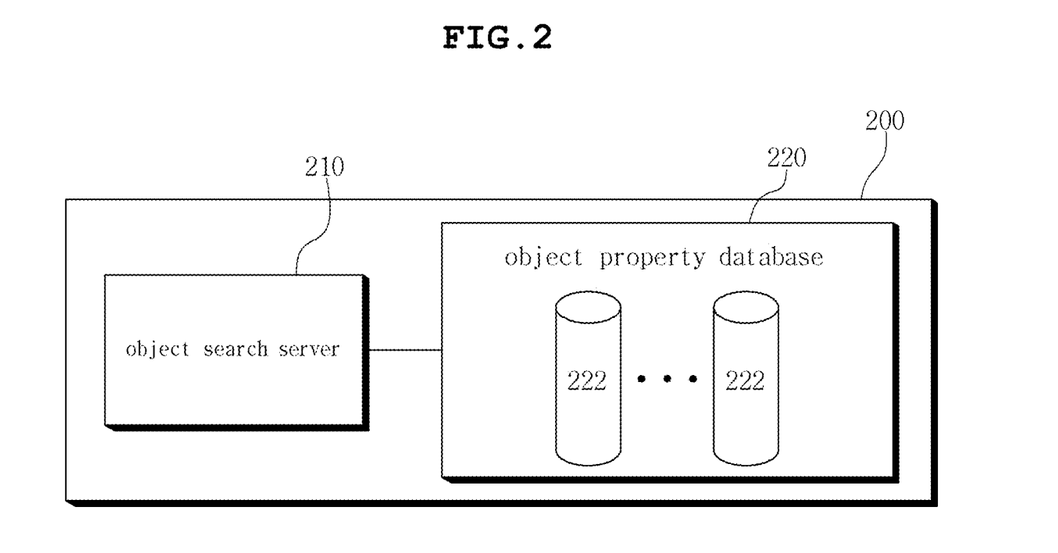
FIG. 2 shows an object providing device of an object property-based system according to the present invention.

The object providing device 200 communicating data with the search requester terminal 100 includes an object search server 210, and an object property database 220 connected to the object search server 210, as shown in FIG. 2.

The object property database 220 is configured to include information on properties of the object. The object property database 220 includes a plurality of specific property databases 222 for storing information corresponding to properties of the object. Each of these specific property databases 222 may be, for example, a texture database that stores information on texture properties of the object, a brightness/saturation database that stores information on brightness and saturation properties of the object, a color distribution database for storing information on color distribution properties of the object, and an emotive word database for storing information on emotive word properties of the object.

For example, as described above, the information on texture properties of the object includes information for classifying the texture of the object via numerical values, that is, information capable of dividing the object via texture using numerical values of the texture, and basic information of the object associated with the numerical value of the texture. In addition to the information on the texture properties of the object, the information on each of brightness and saturation properties, color distribution properties, and emotive word properties of the object includes information for classifying brightness and saturation, color distribution, and emotive words of the object via their numerical values or inherent values, and basic information of the object associated with the numerical value of the corresponding properties, where the object may be divided via each property such as brightness and saturation, color distribution, and an emotive word using these numerical values.

Thus, the object property database 220 is configured to classify and store the object via each property such as brightness and saturation, color distribution, and emotive word, through the specific property database.

The object search server 210 is configured to search for an object associated with the object properties transmitted from the search requester terminal 100 using the object property database 220 and to transmit information related to the object searched for to the search requester terminal 100.

For example, when a search requester selects "smooth" from 「Find via texture」, "brightness level 3" and "saturation level 3" from 「Find via brightness/saturation」, "red" from 「Find via color distribution」, and "pure" and "mystical" from 「Find via emotive words」 in an object property-based list section 320 on the display 310 of the terminal as shown in FIG. 3, in order to search for a desired artwork, the object search server 210 comprehensively searches the object property database 220 based on information on "smooth" property, information on "brightness and saturation level 3" property, information on "red" property, information on "pure" and "mystical" property, and then prioritizes resulting objects 410 obtained by considering the input items of the search requester, i.e., artworks which are smooth, have brightness and saturation level 3, include red color, and are pure and mystical, thereby transmitting the resulting objects 410 to the search requester terminal 100 in a form of a list.

Here, the expression "the object search server 210 comprehensively searches the object property database 220 based on information on properties of the object and prioritizes the objects" means that "the object search server determines an order of priority for the plurality of object properties, extracts the objects in an inverted-pyramid format based on information on the plurality of object properties, that is, numerical values for these properties, and then define the extracted objects in an optimal order of objects". Note that although the order of priority for the plurality of object properties is preferably set in the order of "texture", "brightness/saturation", "color distribution", and "emotive words" in the present invention, the order may be set by a manager of the object search server. For example, if the order of priority for the plurality of object properties is defined in the order of "texture", "brightness/saturation", "color distribution", and "emotive words", the object search server first extracts an object representing a degree of "smooth" from information on the "texture" properties of the object, i.e., numerical values of the texture, finds objects corresponding to "brightness level 3" and "brightness level 3" from information on the "brightness/saturation" property, i.e., numerical values of "brightness/saturation" among the objects extracted, finds objects corresponding to "red" from the numerical values of the color distribution among the objects found, and then extracts objects corresponding to "pure" and "mystical" from numerical values of emotive words among the objects found, resulting that the most optimal objects are arranged in a numerical order and transmitted to the search requester terminal 100.

Of course, in the present application, although the search requester selects all the texture properties, the brightness/saturation properties, the color distribution properties, and the emotive words properties (「Find via texture」, 「Find via brightness/saturation」, 「Find via color distribution」, and 「Find via emotive words」) to get the desired artwork, not all of them need to be selected and one or more of them may be selected according to personal preference of the search requester.

Figure 4:
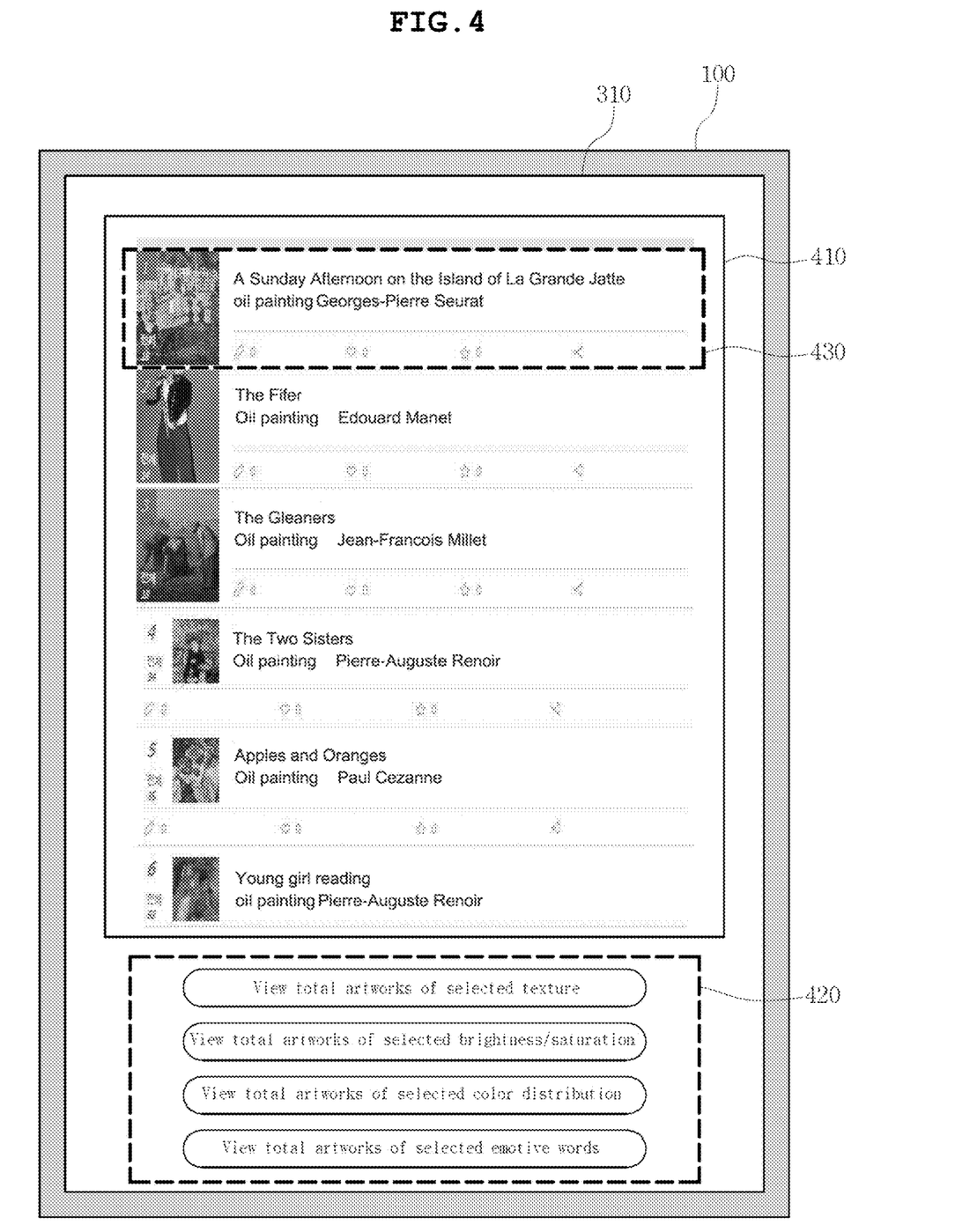
FIG. 4 is a photograph of one example of a list section displayed on a display of a search requester terminal, which enables to view all the objects related to each selected object property together with a resulting object via selection of a plurality of object properties according to the present invention.

In addition, when the object search server 210 transmits the resulting objects 410 comprehensively considered as described above to the search requester terminal 100, the object search server 210 also transmits an auxiliary list section 420 for allowing the user to view all the objects associated with the object properties input by the search requester together with the results.

The auxiliary list section 420 is preferable when a search requester requires more object information. When the search requester selects one, for example, 「View total artworks of selected texture」 from the auxiliary list section 420, the object search server 210 may search the object property database 220 based on the selected texture of the information on the "smooth" property, i.e., numerical values for the "smooth" property, and arrange the artworks with "smooth" texture in a numerical order, thereby providing the arranged objects to the search requester in a form of a list. Similarly, in lists such as 「View total artworks of selected brightness/saturation」, 「View total artworks of selected color distribution」, and 「View total artworks of selected emotive words」, based on numerical values for these properties, the object search server 210 searches the object property database 220 and arranges the corresponding artworks in a numerical order, thereby providing them to the search requester in a form of a list.

As described above, for example, when the search requester wants to find a desired artwork, the object search server 210 does not provide only one artwork to the search requester, but provides all artworks obtained by ranking the search requester's personal preferences from high to low, thereby allowing the search requester to obtain a variety of artworks.

Figure 5:
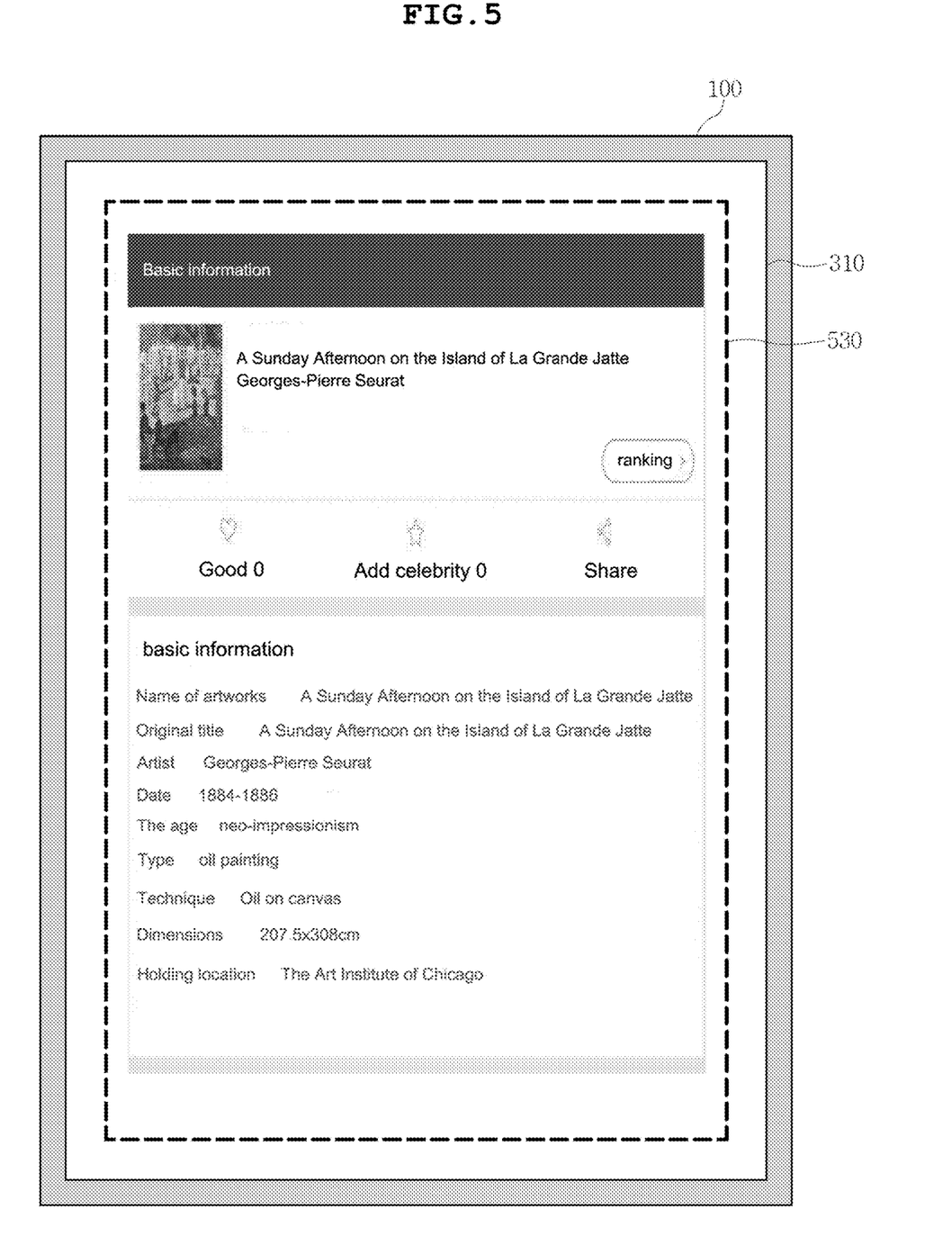
FIG. 5 is a photograph of one example of a final result displayed on the display of the search requester terminal according to the present invention.

FIG. 5 is a photograph of one example of a final result displayed on a display of the search requester terminal according to the present invention. When the search requester additionally selects the object 430 to be obtained through the search requester terminal 100 as shown in FIG. 4, the object search server 210 may search the object property database 220 and provide information 530 related to the object, e.g., basic information of artworks, to the search requester as shown in FIG. 5. The basic information of the object includes at least one of a title or name, an original title, an artist, a production date, the age, a type, a technique, dimensions, and a holding location of the object, associated with the object.

Hereinafter, with reference to FIG. 6, it will be described how the present system searches for an object based on a property thereof.

Figure 6:
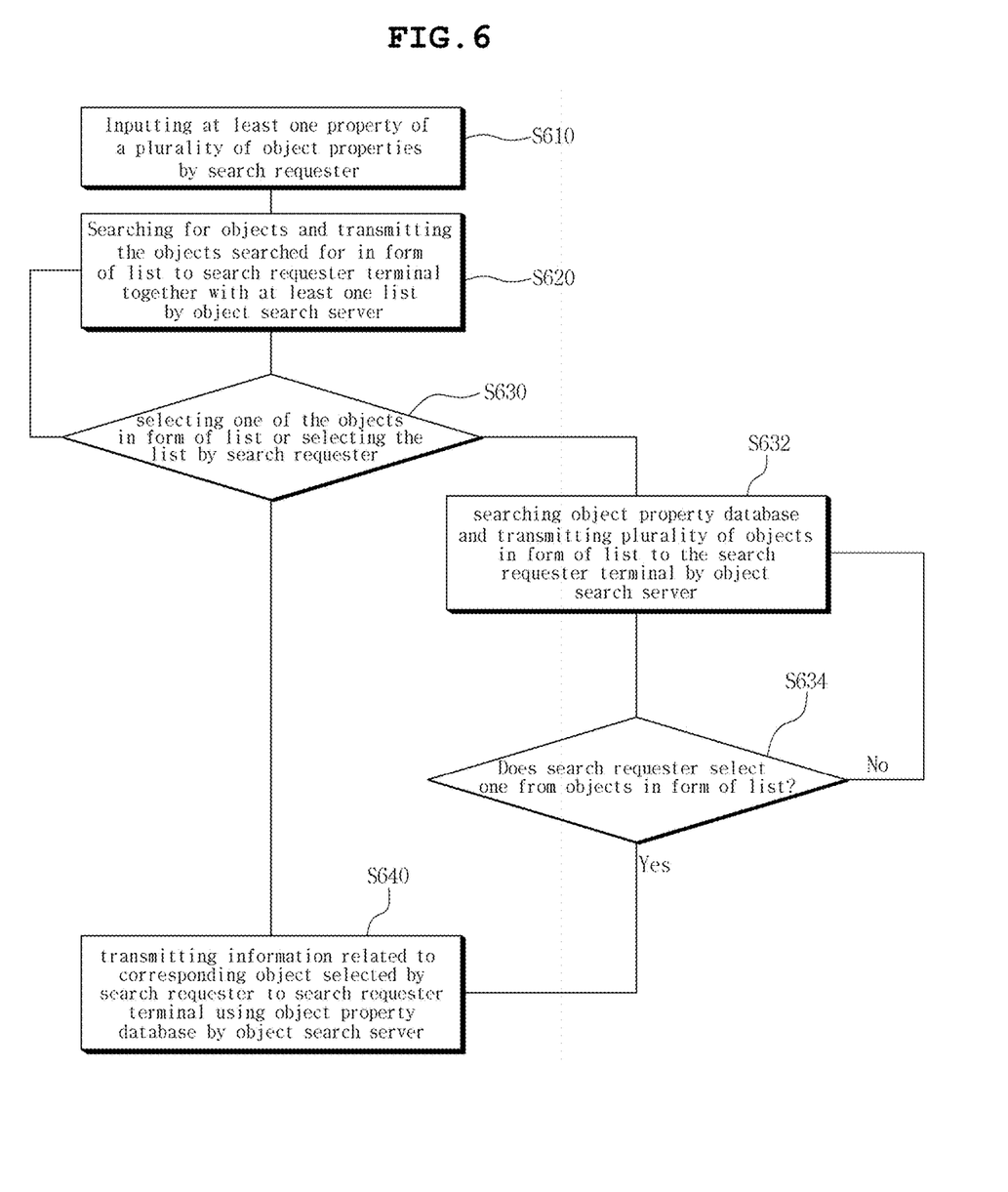
FIG. 6 is a flowchart for explaining a method of searching for an object based on a property thereof according to the present invention.

First, as shown in FIG. 6, the method includes a step S610 in which a search requester inputs at least one property of a plurality of object properties through a search requester terminal. For example, as shown in FIG. 3, the search requester selects "smooth" from 「Find via texture」, "brightness level 3" and "saturation level 3" from 「Find via brightness/saturation」, "Red" from 「Find via color distribution」, and "pure" and "mystical" from 「Find via emotive words」 displayed on the display 310.

Next, in S620, the object search server 210 searches for an object according to the object properties transmitted from the search requester terminal using the object property database 220, that is, searches the object property database according to inputs from the search requester terminal performed in the step 610, and then transmits the object searched for to the search requester terminal. Herein, the object searched for is a plurality of objects, and when the objects searched for are transmitted to the search requester terminal, the object search server sets an order of priority for the plurality of object properties, extracts the objects in an inverted-pyramid format based on information on properties of the objects, and defines the extracted objects in an optimal order thereof, resulting that the objects are displayed on the display 310 in a form of a list (see FIG. 4).

In step S620, when the object search server 210 transmits the information related to the object searched for to the search requester terminal, the object search server 210 transmits at least one list to allow the search requester to view all the objects related to the object properties input by the search requester, together with the objects searched for.

If the search requester selects one of the objects in a form of a list in the step S620 through the search requester terminal (S630), the object search server searches the object property database and transmits information related to the corresponding object selected by the search requester to the search requester terminal (S640). When the search requester selects the list through the search requester terminal in the step S630, the object search server searches the object property database storing information on the object properties selected by the search requester based on information on the object properties, and transmits the plurality of objects to the search requester terminal in a form of a list obtained by prioritizing the plurality of objects in step S632. Hereinafter, the method proceeds to step S634. On the other hand, if the search requester has not made any selection in the step S630, the method proceeds to the step S620.

In the step S634, if the search requester selects one object from the objects in a form of a list, the method proceeds to step S640, and if the search requester does not select any object, the method remains in the step S634.

While the present invention has been particularly shown and described with reference to exemplary embodiments thereof, it is obvious that the invention is not limited to the disclosed exemplary embodiments and may be modified or improved by those skilled in the art within the spirit and scope of the invention.

All such modification and variations are intended to be included within the scope of the present invention, and the specific protective scope of the present invention will be clarified by the appended claims.

The invention claimed is:

1. An object property-based search system comprising:
   a search requester terminal for enabling a search requester to input at least two object properties of a plurality of object properties and receiving a search result based on the object properties,
   wherein the search requester terminal comprises a computer or a smart phone; and
   an object providing device including:
      an object property database in which the plurality of object properties is stored; and
      an object search server for receiving a search request for the at least two object properties from the search requester terminal, searching for an object corresponding to the object properties transmitted from the search requester terminal using the object property database, and transmitting the object searched for to the search requester terminal;
   wherein the object properties are defined as characteristics or attributes inherent to the object, and the object property database is configured to include information on the object properties,
   the object searched for is a plurality of objects,
   the object search server determines an order of priority for the at least two object properties,
   the object search server extracts the plurality of objects from the object property database including information on the object properties, based on the determined order of priority and the information on the object properties, and transmits the plurality of objects to the search requester terminal in a form of a list obtained by prioritizing the plurality of objects,
   the object search server transmits an auxiliary list section comprising at least two lists associated with each of the at least two object properties together with the object searched for so that both the at least two lists and the object searched for are displayed on the search requester terminal, when transmitting information on the object searched for to the search requester terminal, and the auxiliary list section makes it possible to view all objects belonging to the at least two lists, and
   the object search server comprises a server computer, wherein the server computer comprises a processor and a non-transitory computer-readable storage medium.

2. The object property-based search system of claim 1, wherein when the object search server receives a list selected of the at least two lists, on the search requester terminal from the search requester terminal, the object search server searches the object property database based on the information on the object properties to find a plurality of objects corresponding to a search request associated with the list, and transmits the plurality of objects to the search requester terminal in a form of a list obtained by prioritizing the plurality of objects.

3. The object property-based search system of claim 1, wherein when the object search server further receives a second search request for an object of the plurality of objects from the search requester terminal, the object search server further searches the object property database and transmits information related to the object corresponding to the second search request to the search requester terminal.

4. The object property-based search system of claim 1, wherein the information on the object properties includes information for classifying the object properties into numerical values and information related to objects associated with the classified values.

5. The object property-based search system of claim 2, wherein when the object search server further receives a second search request for an object of the plurality of objects from the search requester terminal, the object search server further searches the object property database and transmits information related to the object corresponding to the second search request to the search requester terminal.

6. The object property-based search system of claim 4, wherein the information related to objects includes at least one of a title or name, an original title, an artist, a production date, the age, a type, a technique, dimensions, and a holding location of the object, associated with the objects.

7. A method of searching for an object based on a property thereof by an object search server, comprising:
  receiving a search request for at least two object properties of a plurality of object properties from a search requester terminal;
  searching for an object corresponding to the object property transmitted from the search requester terminal using information on object properties of an object property database in which the plurality of object properties are stored; and
  transmitting the object searched for to the search requester terminal,
  wherein the object properties are defined as characteristics and attributes inherent to the object
  the object searched for is a plurality of objects,
  the searching for the object further includes determining an order of priority for the at least two object properties, and extracting the plurality of objects from the object property database including information on the object properties, based on the determined order of priority and the information on the object properties,
  the transmitting the object searched for to the search requester terminal further includes transmitting the plurality of objects to the search requester terminal in a form of a list obtained by prioritizing the plurality of objects, and
  the transmitting the object searched for to the search requester terminal further includes transmitting an auxiliary list section comprising at least two lists associated with each of the at least two object properties together with the object searched for so that both the at least two lists and the object searched for are displayed on the search requester terminal, and the auxiliary list section makes it possible to view all objects belonging to the at least two lists.

8. The method of claim 7, further comprising, when the object search server receives a list selected of the at least two lists, on the search requester terminal from the search requester terminal, searching the object property database based on the information on the object properties to find a plurality of objects corresponding to the search request associated with the list, and transmitting the plurality of objects to the search requester terminal in a form of a list obtained by prioritizing the plurality of objects.

9. The method of claim 7, further comprising, when the object search server further receives a second search request for an object of the plurality of objects from the search requester terminal, further searching the object property database and transmitting information related to the object corresponding to the second search request to the search requester terminal.

10. The method of claim 7, wherein the information on the object properties includes information for classifying the object properties into numerical values and information related to the object associated with the classified values.

11. The method of claim 8, further comprising, when the object search server further receives a second search request for an object of the plurality of objects from the search requester terminal, further searching the object property database and transmitting information related to the object corresponding to the second search request to the search requester terminal.

12. The method of claim 10, wherein the information related to the object includes at least one of a title or name, an original title, an artist, a production date, the age, a type, a technique, dimensions, and a holding location of the object, associated with the object.

* * * * *